I. F. HOLMGREN.
METHOD OF QUANTITATIVE ANALYSIS OF SOLUTIONS.
APPLICATION FILED SEPT. 12, 1910.
1,012,639.
Patented Dec. 26, 1911.
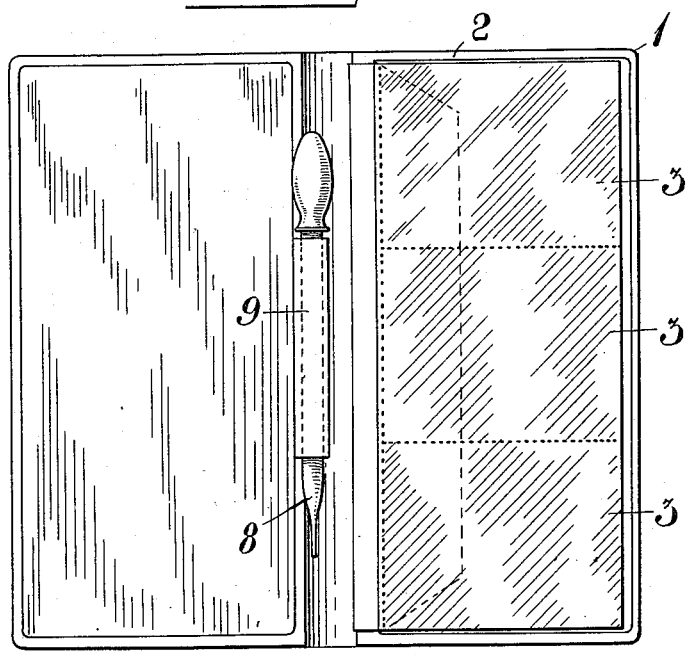
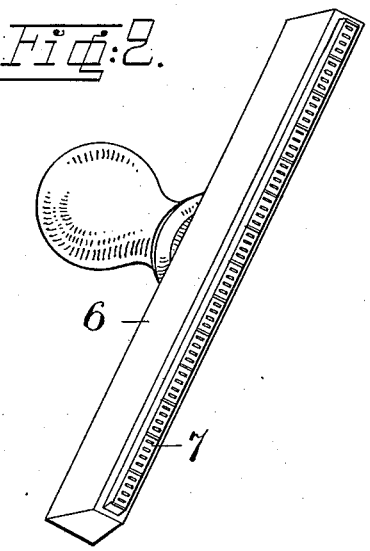
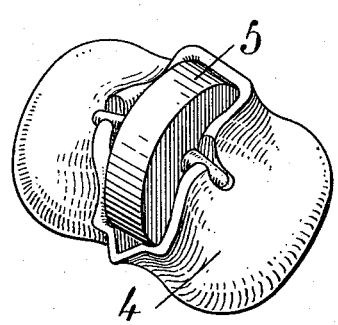

UNITED STATES PATENT OFFICE.

ISRAEL FRITIOFSON HOLMGREN, OF STOCKHOLM, SWEDEN.

METHOD OF QUANTITATIVE ANALYSIS OF SOLUTIONS.

1,012,639.  Specification of Letters Patent.  Patented Dec. 26, 1911.

Application filed September 12, 1910. Serial No. 581,579.

*To all whom it may concern:*

Be it known that I, ISRAEL FRITIOFSON HOLMGREN, doctor of medicine, subject of the King of Sweden, residing at Birger Jarlsgatan 19, Stockholm, in the Kingdom of Sweden, have invented new and useful Improvements in Methods and Means for Quantitative Analysis of Solutions, of which the following is a specification.

The present invention has for its object an improvement in the method and means for quantitative analysis of solutions, by the help of adsorption phenomena.

The invention is founded on the following facts and observations. If a diluted solution in water of for instance hydrochloric acid (HCl) is dropped on blotting paper adsorption phenomena take place which may be directly observed, as the blot which is thereby caused on the paper, appears to consist of a central circular portion and an annular zone surrounding the same. The ratio between the areas of said circular portion and the said zone depends on the concentration of the solutions tested. If, for instance, by means of a steel-pen, dipped in a solution of one per cent. "Congo-red," a line is drawn on blotting-paper, and thereafter a drop of a solution of hydrochloric acid in water is put on a point of said line, it appears, that not the whole part of the line contained within the wet blot will turn blue color but only the central part of the same *i. e.* the part, contained in the above mentioned central circular portion. From this fact it appears that the solution of the hydrochloric acid, when dropped on the blot is separated in such a way, that the hydrochloric acid remains in the central part of the blotting paper, while the water by adsorption spreads itself farther out from the center, and forms an annular zone around the central blot caused by the acid in the water. Now I have, as above mentioned, further found, that the ratio between the areas of the central blot formed by the acid and the annular zone, formed by the water, is an expression for or stands in a certain relation to the concentration of the solution. Said proportions vary in exactly the same rate as the concentration of the solution is varied. If, for instance, a blot produced on the blotting paper, by means of a solution, containing 0.2 per cent. HCl, is compared with a blot produced by means of a solution containing 0.1 per cent. HCl, it appears, that the ratio between the areas of the central blot caused by the acid and of the surrounding annular zone caused by the water, is in the first mentioned case exactly twice as great as in the latter case. Thus, the hydrochloric acid spreads itself farther from the center, the more concentrated the solution is. This law may be expressed by the following formula which may be used for quantitative analysis of solutions:

$$P = \frac{kr^2}{R^2 - r^2}$$

In this formula P is the percentage of the substance of the solution tested. R is the radius of the whole blot, produced on the blotting paper by the solution dropped thereon as above described and $r$ is the radius of the inner central blot, formed as above described by the substance dissolved in the solution, and $k$ is a constant, the value of which depends on the properties of the blotting paper and which must be ascertained for each kind of blotting paper used. Thus, if on a piece of blotting paper, the above mentioned constant of which has been ascertained, a scale or a line is by means of Congo-red printed or drawn, and thereupon one or a few drops of a solution of for instance hydrochloric acid is dropped on a point of said scale or line, and the radius of the inner central blot and of the whole blot thus produced is measured or directly read off on the scale, the concentration of the solution may in accordance with the above stated formula easily be ascertained. In order to get the result in a more quick and convenient manner a table containing the value of P for different values of R, $r$ and $k$ may be once for all calculated and used.

On the accompanying drawing are shown as examples in Figures 1, 2 and 3 devices which may suitably be used, for carrying out the analysis according to the present invention.

Fig. 1 shows a book-cover 1 containing a block 2 of blotting paper removably fastened into said cover. The sheets of the blotting paper are, by means of perforations, divided in sections 3 of suitable size.

Fig. 2 shows a stamp suitable for printing the scale on the blotting paper as above described. Said stamp consists of holder 6, and a printing type 7 of caoutchouc or the like, adapted for printing the scale.

Fig. 3 shows a suitable device for inking the stamp consisting of a receptacle 4 and a roller 5 rotatably arranged in said receptacle. The solution used as an indicator is contained in said receptacle and by drawing the printing surface of the stamp over the surface of the roller the roller will be rotated and the solution by means of the roller transferred upon the printing surface of the stamp.

When an analysis is to be carried out, a scale is, in the above mentioned manner, printed on a section of a sheet of the blotting paper by means of the stamp, which is inked by a solution of Congo-red or any other solution suitable for indicating means. By means of the pipette 8 which, when not used, is suitably inserted in the sleeve 9 in the book-cover, one or a few drops of the solution which is to be analyzed, is dropped on the blotting paper at a certain point of the scale, thus produced, whereby, as above described, a blot will appear having a central circular portion, and a surrounding annular zone, the radii of which may easily be read off on the scale, as, when Congo-red is used, and the solution to be analyzed is an acid, the part of the scale which is contained within the central circular portion turns blue, while the part contained within the surrounding annular zone remains red. The concentration of the solution tested may then be calculated by help of the above stated formula or better by the help of a table prepared for the purpose, which table may also suitably be fastened in the book-cover 1.

I have, in order to explain the invention, mentioned as example a solution of hydrochloric acid, but my invention may of course also be used for analyzing other solutions as for instance solutions of sulfuric acid, nitric acid and phosphoric acid and of course also other suitable indicators than Congo-red may be used. With regard to the indicator the only condition is that it must show a clear change of color, so that the inner central part of the blot containing the substance may be clearly distinguished from the surrounding annular zone of the blot.

Of course other devices than those above described may be used for carrying out the analysis without departing from the idea of my invention.

In order to give an idea of the volumes of solutions necessary for the analysis according to the present invention, I may state that in an analysis carried out by me with the use of a blotting paper, the constant $k$ of which was 0.22, I used 0.07 cubic centimeters of a solution of hydrochloric acid which gave on the blotting paper a blot, the radius of which was 12 millimeters, thus sufficiently great for the purpose. From this example it may be understood, that very small quantities of the solution to be tested are sufficient. If it be assumed, that the analysis gives as result that the percentage of HCl is 0.05 per cent. and the quantity of the solution used was 0.05 cubic centimeters the quantity of HCl ascertained by the analysis was only 0.025 milligram. From this it may be understood, that the method is a very exact one. It may be added, that this example is not simply a theoretical one, but it is really carried out in practice. This method is therefore especially suitable for determining the percentage of HCl in gastric juice. The method may of course also be carried out in such a way that a block of blotting paper may be used on the several pages of which the scale may be printed before they are fastened together to form a block, either by means of a substance serving as an indicator, or by ordinary printing color, in which latter case the blotting paper preferably is impregnated or prepared with a substance serving as an indicator.

Having thus described my invention, I declare that what I claim is:—

1. The herein described method of determining the percentage of a substance in solution which consists in forming a scale upon unsized paper by means of an indicating medium which is adapted to change its color by influence of the substance which is to be determined, placing a small quantity of the solution upon a point of said scale and determining by means of said scale the ratio between the area of the central circular portion of the wet spot which has changed color and the area of the annular zone portion of the spot which has not changed color and which surrounds the said central portion.

2. The herein described method of determining the percentage of a substance in solution which consists in treating unsized paper with an indicating medium which is adapted to change its color when the substance, the quantity of which is to be determined, is applied thereto, placing on the treated paper a small quantity of the solution and determining the ratio between the portion of the wet spot which has changed its color and the portion of the wet spot which has not changed its color.

In testimony whereof I have signed my name to this specification in the presence of two subscribing witnesses.

ISRAEL FRITIOFSON HOLMGREN.

Witnesses:
 AUG. HAZELIN,
 ALMA PATTERSSON.

Copies of this patent may be obtained for five cents each, by addressing the "Commissioner of Patents, Washington, D. C."